(12) United States Patent
Matsumura

(10) Patent No.: US 9,787,074 B1
(45) Date of Patent: Oct. 10, 2017

(54) ELECTRIC JUNCTION BOX ASSEMBLIES WITH ACCESS HOOD

(71) Applicant: Sumitomo Wiring Systems, Ltd., Yokkaichi, Mie (JP)

(72) Inventor: Akihiro Maximilian Matsumura, Farmington Hills, MI (US)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/166,851

(22) Filed: May 27, 2016

(51) Int. Cl.
*H02G 3/16* (2006.01)
*B60R 16/023* (2006.01)

(52) U.S. Cl.
CPC .......... *H02G 3/16* (2013.01); *B60R 16/0239* (2013.01)

(58) Field of Classification Search
USPC ....................................................... 174/549
See application file for complete search history.

(56) References Cited

U.S. PATENT DOCUMENTS

| 4,979,634 A * | 12/1990 | Begley .................. H01H 9/287 16/267 |
| 6,066,802 A * | 5/2000 | Reinke .................... H01F 27/02 174/50 |

FOREIGN PATENT DOCUMENTS

| JP | 2009-189082 | 8/2009 |
| JP | 2012-191711 | 10/2012 |

\* cited by examiner

*Primary Examiner* — Dhirubhai R Patel
(74) *Attorney, Agent, or Firm* — Dinsmore & Shohl LLP

(57) ABSTRACT

Electric junction box assemblies with an access hood for providing access to an eyelet terminal is provided. The electric junction box assembly includes a junction box configured to store electric components. The junction box includes an eyelet terminal support configured to support an eyelet terminal connection. A top cover is mounted onto the junction box. The top cover includes a first cut-out and a hood mounting structure. A hood is shaped so as to both engage and disengage the hood mounting structure and cover the eyelet terminal opening. In one instance the closing member of the hood is configured to engage the hood mounting structure so as to cover the eyelet terminal connection. In another instance, the hood may be disengaged so as to expose the eyelet terminal connection without having to remove the cover from the junction box.

12 Claims, 5 Drawing Sheets

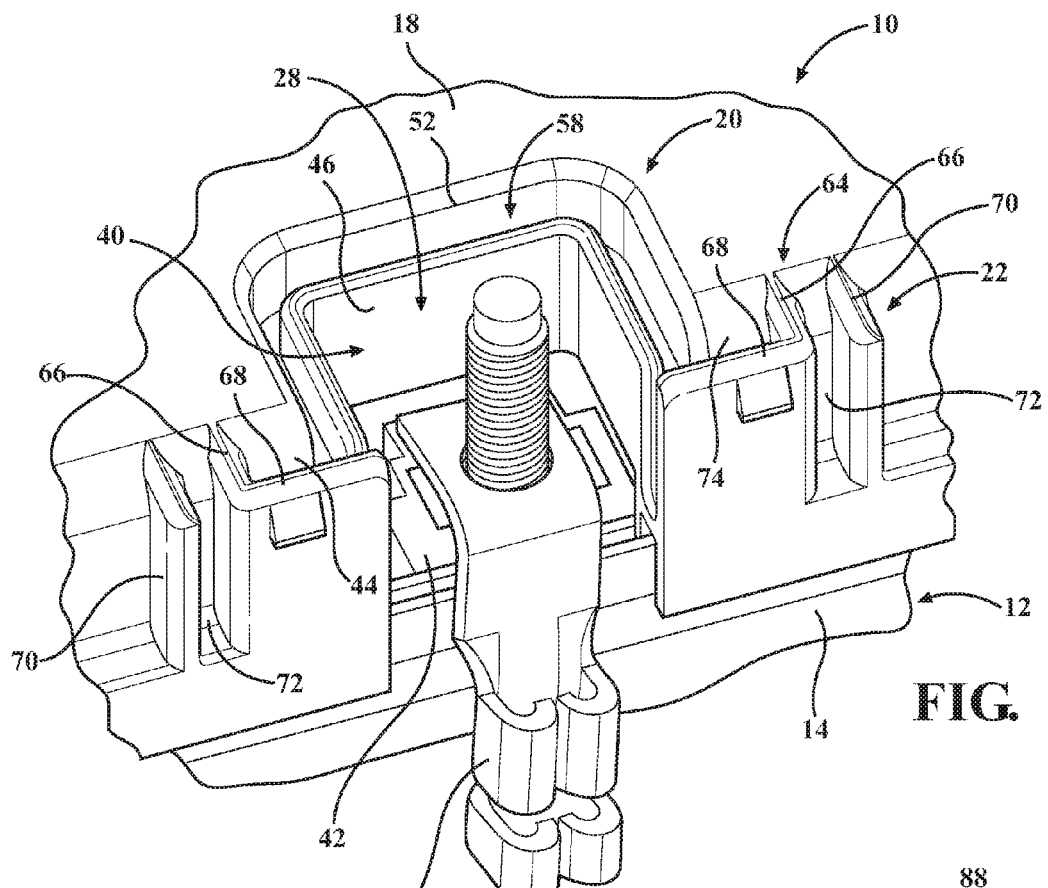
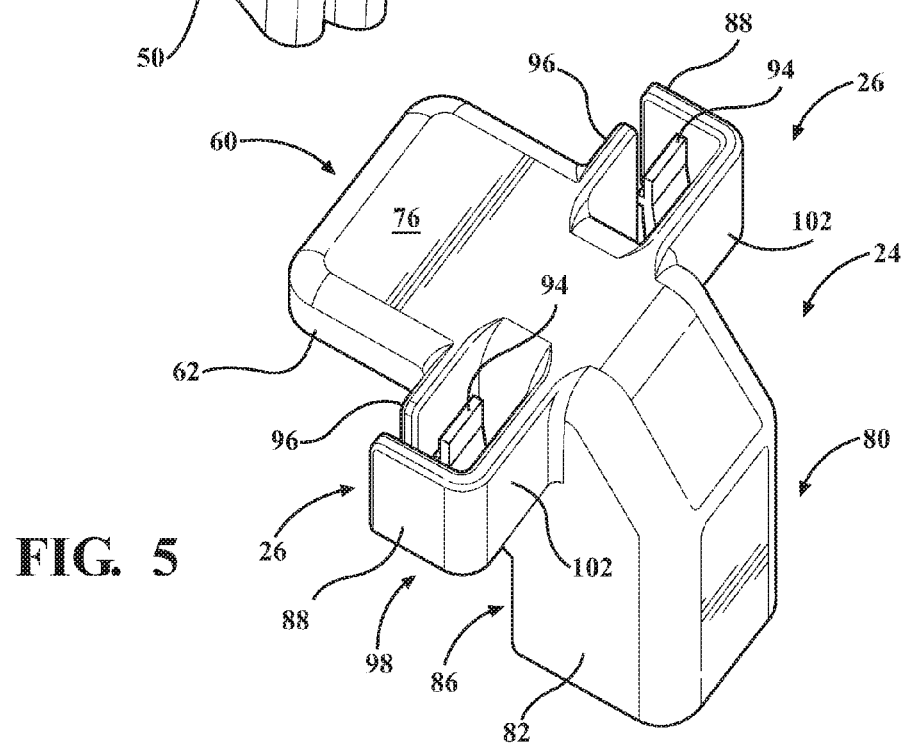
FIG. 4
FIG. 5

ELECTRIC JUNCTION BOX ASSEMBLIES WITH ACCESS HOOD

TECHNICAL FIELD

The present specification generally relates to electric junction box assemblies and, more particularly, electric junction box assemblies with an access hood providing access to an eyelet terminal.

BACKGROUND

In general, electric junction box assemblies include a junction box for storing electric components and a top cover enclosing the junction box. The electric components are configured to power electronic devices. The electric components illustratively include a bus bar, relays and switches. The electric components may be further configured to control electric devices. For instance, the electric junction box assemblies may be used in an automotive vehicle to distribute power to and control the actuation of windshield wipers, fans for the Heating Ventilation and Air Conditioning system, mirrors or the like." The amendment is made to make clear what HVAC stands for. No new matter was entered.

The electric junction box assembly is typically manufactured by a supplier and delivered to an original equipment manufacturer for installation into a product. Using an automotive manufacturer as an example, the electric junction box is installed into the automotive vehicle by a factory worker. Since it is imperative that the electric components are kept dry and undamaged prior to installation, the electric junction box assembly is delivered fully assembled. In particular, the top cover is installed onto the junction box.

The factory worker is then required to remove the top cover from the junction box so as to attach electrical power connections to the components of the junction box. However, there are instances where it is desirable to remove the power connection subsequent to installation to the automotive vehicle. In such instances, the entire top cover must be removed which increases the manufacturing time of the vehicle. Further, removal of the entire top cover exposes the electric components which increases the chance for accidental/unintentional damage to occur to the electronic components. Accordingly, it remains desirable to have electric junction box assemblies having an access hood covering the terminal eyelet so as to allow workers to access the eyelet terminal without having to remove the entire top cover. It further remains desirable to have electric junction box assemblies configured to provide access to the eyelet terminal without exposing the other electric components to damage from unintended acts.

SUMMARY

In one embodiment, an electric junction box with an access hood for providing access to an eyelet terminal is provided. The electric junction box assembly houses electric components configured to control an electrically powered device. The electric junction box assembly includes a junction box. The junction box includes an eyelet terminal support and an eyelet terminal connection. The eyelet terminal support may bound, entirely or partially, the eyelet terminal connection so as to define an eyelet terminal opening. The eyelet terminal connection is mounted to the eyelet terminal support and accessible through the eyelet terminal opening. The electric junction box assembly further includes a cover configured to mount onto the junction box. The cover includes a first cut-out and a hood mounting structure. The cover is configured to cover the junction box but keep the eyelet terminal opening exposed.

The electric junction box assembly further includes a hood having a closing member. The hood is configured to engage and disengage the hood mounting structure so as to cover the eyelet terminal opening. In one instance the closing member is configured to engage the hood mounting structure so as to cover the eyelet terminal connection and in another instance the closing member configured to disengage from the hood mounting so as to expose the eyelet terminal connection without having to remove the cover from the junction box.

In one embodiment of the electric junction box assembly, the electric junction box includes the junction box includes a bottom housing and a bottom cover. The bottom housing include a plurality of connector housings for supporting electrical components and connectors, to include switches, relays, controllers and the like.

In one embodiment of the electric junction box assembly, the first cut-out is disposed on a first outer wall of the cover. The eyelet terminal support is disposed on a second outer wall of the junction box. In such an embodiment, the eyelet terminal connection is partially disposed along an outer wall of the junction box.

In one embodiment of the electric junction box assembly, the closing member of the hood and the hood mounting structure form a snap-fit engagement. In such an embodiment, the closing member may include a cage with a tang and the hood mounting structure includes a flange and a guide wall, wherein the tang is a resilient member configured to snap into engagement with flange.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 is an isolated partial view of the top cover showing an illustrative embodiment of the hood mounting structure;

FIG. 5 is a perspective view taken from the top of the hood according to one or more embodiments shown or described herein.

DETAILED DESCRIPTION

Reference will now be made in detail to embodiments of an electric junction box with an access hood for providing access to an eyelet terminal. The electric junction box assembly includes a junction box configured to store electric components. The junction box includes an eyelet terminal support configured to support an eyelet terminal connection. The eyelet terminal connection is configured to provide electric power to the electric components.

The electric junction box further includes a top cover configured to mount onto the junction box. The top cover includes a first cut-out and a hood mounting structure. The hood mounting structure is a walled portion of the top cover defining the cut-out and includes support features for which a hood may be mounted to.

The hood includes a closing member. The hood is shaped so as to both engage and disengage the hood mounting structure and cover the eyelet terminal opening. In one instance the closing member of the hood is configured to engage the hood mounting structure so as to cover the eyelet terminal connection. Thus the electric junction box may be supplied to a manufacturer in a state where all the electric components are sealed and protected. However, in the event the electric power connection must be disconnected from the eyelet terminal, the hood may be disengaged so as to expose the eyelet terminal connection without having to remove the cover from the junction box.

Figure 1:
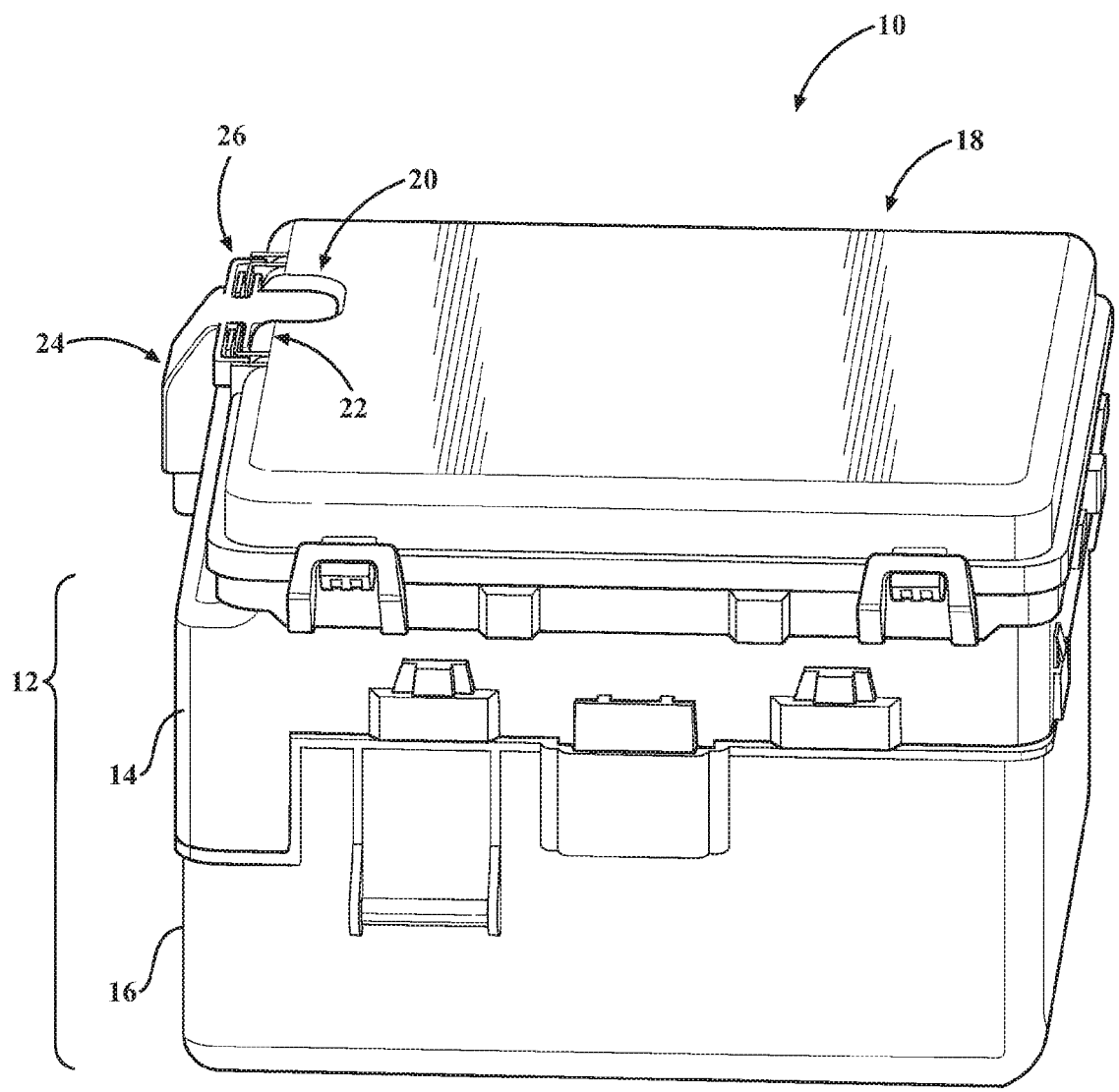
FIG. 1. is a perspective view of an electric junction box assembly according to one or more embodiments shown and described herein.

With reference now to FIG. 1 an illustrative embodiment of an electric junction box assembly 10 is provided. The electric junction box assembly 10 includes a junction box 12 configured to house electric components (not shown). The junction box 12 is illustratively shown having a bottom housing 14 and a bottom cover 16. A top cover 18 is mounted onto the junction box 12. The top cover 18 includes a first cut-out 20 and a hood mounting structure 22. The hood mounting structure 22 is shown adjacent the first cut-out 20.

A hood 24 is mounted to the first cut-out 20. The hood 24 includes a closing member 26 configured to engage and disengage the hood mounting structure 22, wherein the first cut-out 20 is in open communication with an eyelet terminal opening 28 (shown in FIG. 2), wherein in one instance the closing member 26 is configured to engage the hood mounting structure 22 so as to cover the eyelet terminal opening 28 and wherein in another instance the closing member 26 configured to disengage from the hood 24 mounting so as to expose the eyelet terminal opening 28 without having to remove the top cover 18 from the junction box 12.

Figure 2:
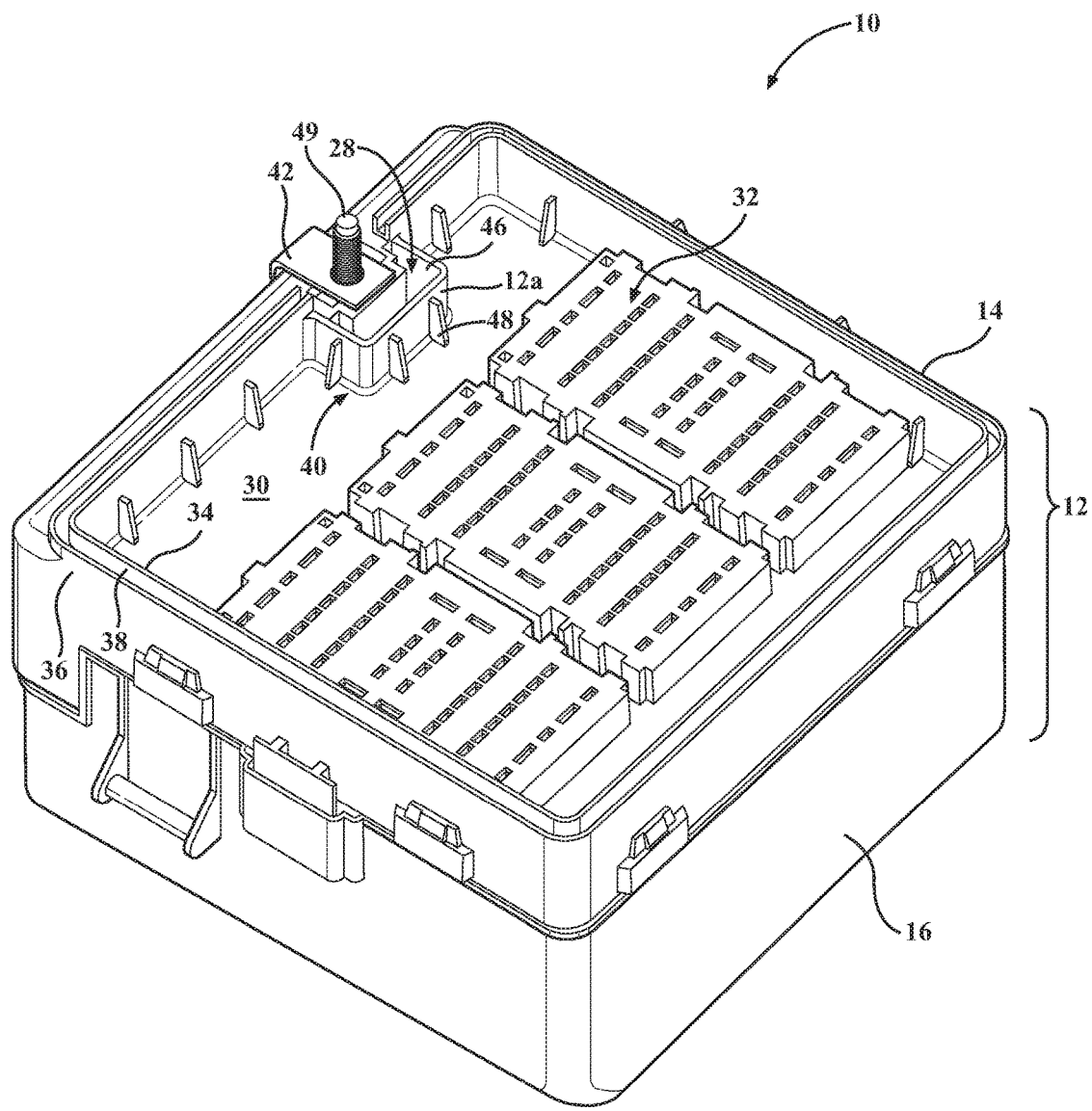
FIG. 2 is a perspective view of the junction box showing the connector heads and the eyelet terminal.

FIG. 2 provides a view of the electric junction box assembly 10 with the top cover 18 removed. FIG. 2 illustrates that the bottom housing 14 is configured to support electric components and connectors, to include switches, relays, controllers and the like (not shown). The design of the junction box 12 is not limiting and may be based upon the number of electric components necessary to control an electric system, or a plurality of electric devices.

The junction box 12 is shown as having a generally rectangular box shaped dimension. The bottom housing 14 is mounted to the bottom cover 16 by a plurality of fasteners having a male part fixedly disposed on an outer wall of the bottom cover 16 and a complimentary female part disposed on an outer wall of the bottom housing 14. Likewise, the bottom housing 14 is mounted to the top cover 18 by a plurality of fasteners having a male part fixedly disposed on an outer wall of the top cover 18 and a complimentary female part disposed on an outer wall of the bottom housing 14. It should be appreciated that the fasteners shown herein are illustrative and not limiting, and any fastener currently known or used in the art may be adapted for use herein.

The bottom housing 14 includes a substrate 30. Integrally formed on the substrate 30 are the connector heads 32. The connector heads 32 have a plurality of openings for which a terminal connector may pass through to complete an electric connection. The bottom housing 14 may include a first inner wall 34 spaced apart from a second outer wall 36 of the bottom housing 14 so as to define a peripheral slit 38 for which a peripheral edge of the top cover 18 may be seated so as to help seal the electric components from the environment.

FIG. 2 illustrates an exemplary location of the eyelet terminal support 40 and an eyelet terminal 42. The eyelet terminal 42 is illustratively shown as being a raised platform having an opening for which a conductive post 44 may be mounted.

The eyelet terminal support 40 is illustratively shown disposed along a portion of the second outer wall 36 of the junction box 12. The eyelet terminal support 40 is a first wall 46 disposed on a top surface 12a of the substrate 30 of the junction box 12. A plurality of ribs 48 may be formed along the first wall 46 so as to provide the first wall 46 with structural rigidity. The eyelet terminal support 40 is open on one end and bounds the periphery of the eyelet terminal 42 so as to define the eyelet terminal opening 28. An eyelet terminal connection 50 may be mounted to the eyelet terminal 42 by accessing the eyelet terminal opening 28.

Figure 3:
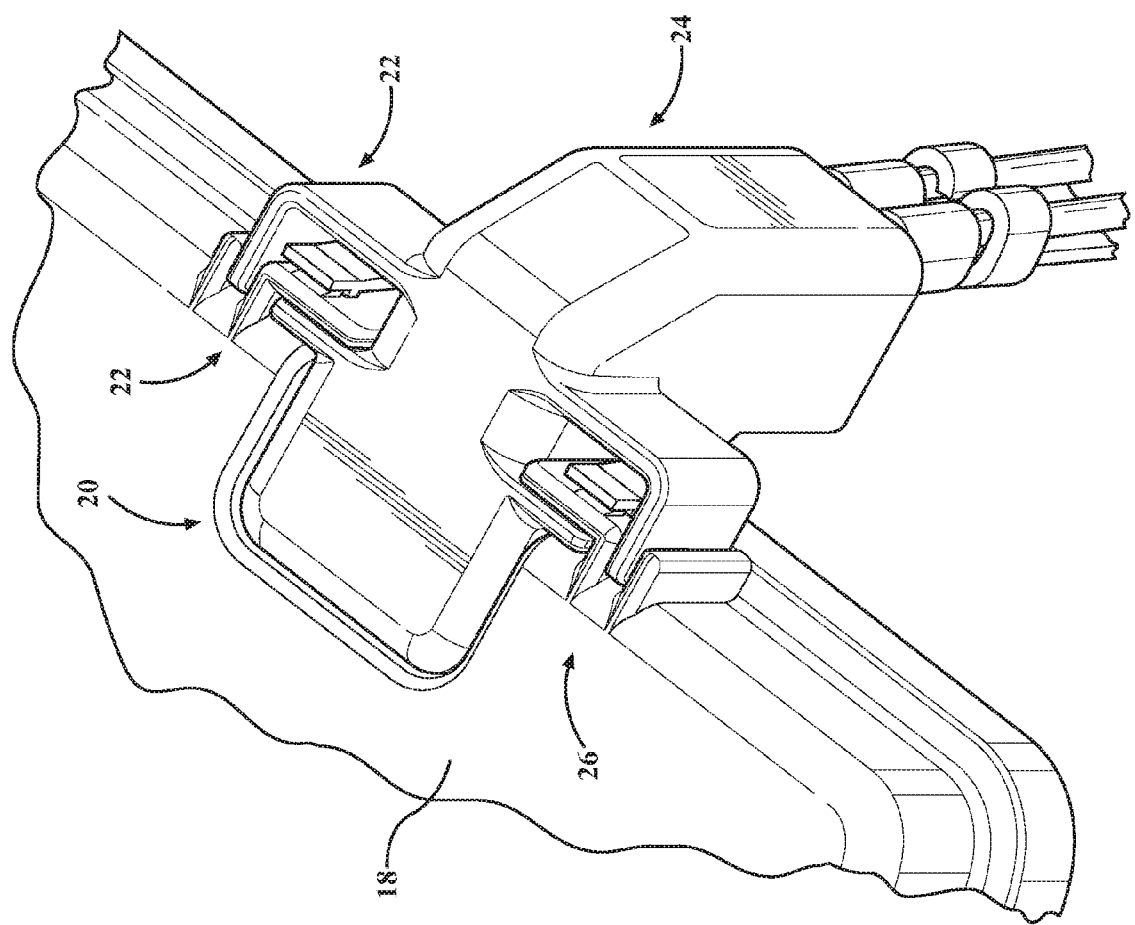
FIG. 3 is an isolated partial view of the top cover and the hood mounted onto the hood mounting structure.

FIG. 3 is an isolated view of the top cover 18 with the hood 24 mounted to the first cut-out 20. The hood 24 is configured to mount onto the junction box 12. FIG. 3 shows how the hood 24 forms a sealed connection with the first cut-out 20. The hood 24 covers the eyelet terminal opening 28 (shown in FIG. 2) so as to protect the connection between the eyelet terminal 42 and the eyelet terminal connection 50 underneath the hood 24. The wires of the eyelet terminal connection 50 are shown extending from a bottom portion of the hood 24.

FIG. 4 is an isolated view of the top cover 18 and the junction box 12 showing the hood mounting structure 22, the eyelet terminal 42, the eyelet terminal support 40 and the first cut-out 20. The hood mounting structure 22 and the first cut-out 20 may be integrally formed to the top cover 18. The first cut-out 20 is disposed on a first outer wall 52 of the cover. Likewise, the eyelet terminal support 40 is illustratively shown being defined by the first wall 46 of the junction box 12. The eyelet terminal 42 and the eyelet terminal support 40 may be integrally formed to the bottom housing 14 of the junction box 12. The bottom housing 14 and the top cover 18 may be made of a polymer suitable for injection molding.

FIG. 4 also provides a detailed perspective of an illustrative embodiment of the hood mounting structure 22. The hood mounting structure 22 includes a lip 54 defining the first cut-out 20. The first outer wall 52 is spaced apart from the first wall 46 so as to define a recess 58 configured to seat the first peripheral wall 62 of the hood 24 (shown in FIG. 5).

The hood mounting structure 22 includes a flange 64 having a first leg 66 orthogonal to a second leg 68. A guide wall 70 is spaced apart from the first leg 66 of the flange 64 so as to define a first slot 72. The flange 64 is preferably formed of a resilient material adaptable for the injection molding process. The second leg 68 is spaced apart from an first outer wall 52 of the top cover 18 so as to define a second slot 74.

Figure 6:
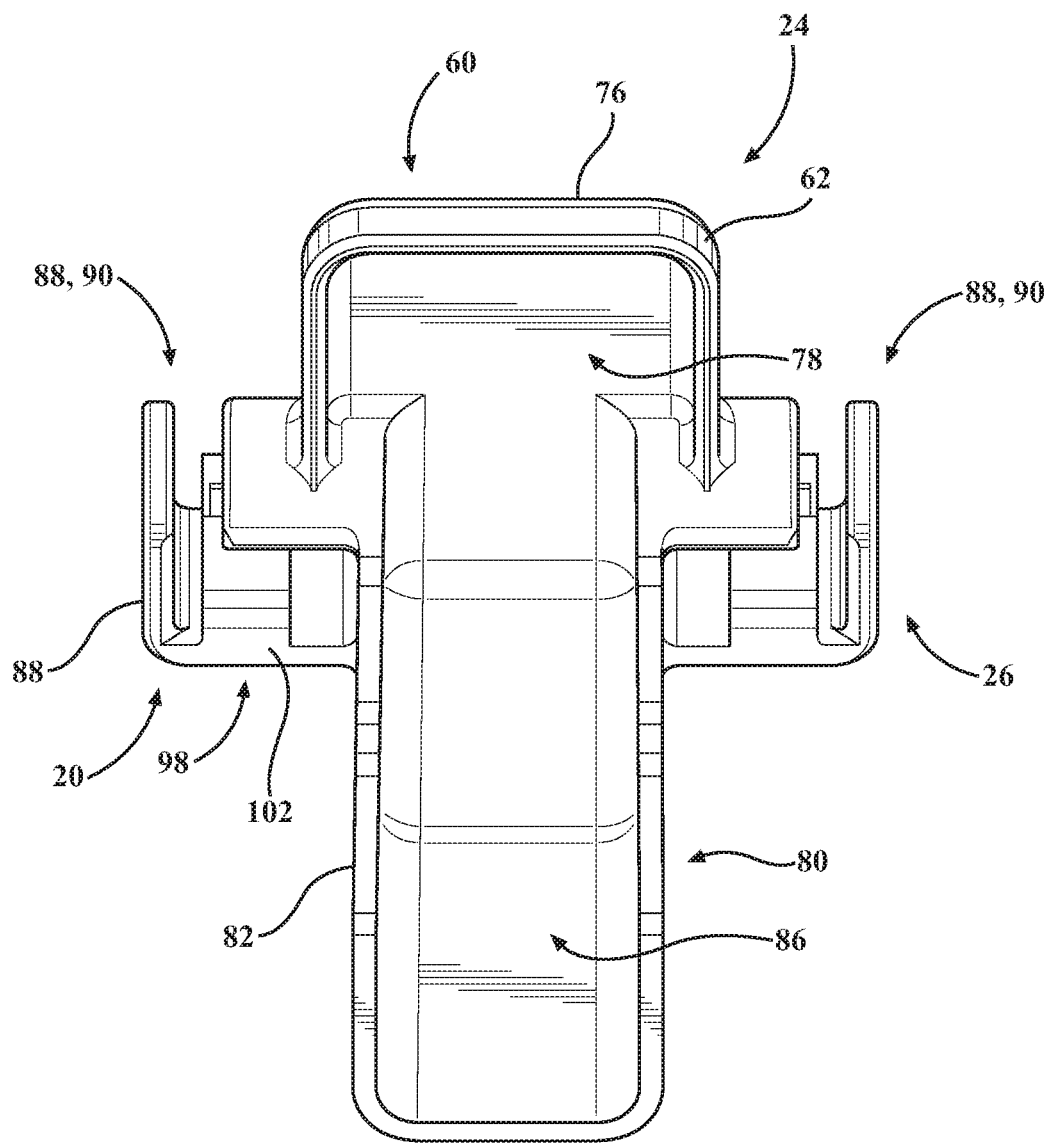
FIG. 6 is a perspective view taken from the bottom of the hood shown in FIG. 5.

FIGS. 5 and 6 provide a detailed perspective of an illustrative embodiment of the hood 24. The hood 24 may be formed of a resilient material adaptable for the injection molding process. The hood 24 includes a top portion 60 having a first peripheral wall 62. The first peripheral wall 62 extends from a top wall 76 so as to define an eyelet terminal housing 78. The eyelet terminal housing 78 defines a packaging space suitable to cover the eyelet terminal connection 50. The hood 24 includes a second portion 80 having a second peripheral wall 82 extending from a back wall 84 so as to define a wire housing 86. The wire housing 86 defines a packaging space suitable to accommodate the elongated wire of the eyelet terminal connection 50. The top portion 60 and the second portion 80 are angled relative to each other.

FIGS. 5 and 6 also provide a detailed perspective of an illustrative embodiment of the closing member 26. The closing member 26 is configured to mate with the hood mounting structure 22 so as to secure the hood 24 to the first cut-out 20. The closing member 26 may include a clip 88 having a cage 90 with an open side 92 and a tang 94 disposed within the cage 90. The tang 94 is configured to engage the hood mounting structure 22 so as to secure the hood 24 to the top cover 18.

The cage 90 is configured to engage the hood mounting structure 22. The cage 90 includes a first side member 96 spaced apart from a second side member 98. The first and second side members 96 and 98 are generally planar members. The tang 94 is disposed between the first side member 96 and the second side member 98. The second side member 98 includes an end portion 88 which is generally orthogonal to a body portion 102.

The cage 90 is mounted to the hood mounting structure 22 wherein the end portion 88 of the clip 88 is inserted into the first slot 72 of the clip 88 so as to be pinched between the guide wall 70 and the first leg 66 of the flange 64. The first side member 96 is inserted into the second slot 74 so as to be disposed between an outer surface of the cover and the second leg 68, wherein the second leg 68 of the flange 64 is pinched between the tang 94 and the first side member 96.

The second leg 68 of the flange 64 is configured to releasably engage the tang 94 so as to connect and disconnect the hood 24 from the top cover 18. In particular, a first surface of the second leg 68 of the flange 64 may include a first catch 104 and the inner surface of the tang 94 includes a second catch 106. The first catch 104 and the second catch 106 may be ramped shaped members having a planar distal edge configured to abut each other so as to prevent the hood 24 from being disengaged from the first cut-out 20.

It should be appreciated that FIGS. 3, 4 and 5 show an embodiment wherein the hood mounting structure 22 includes a pair of flanges 64 disposed on opposite sides of the first cut-out 20 and the closing member 26 includes a pair of cages 90 on opposite sides of the hood 24 and the description provided above is not limiting to the number or configuration of the respective hood mounting structure 22 and closing member 26. For instance, the hood mounting structure 22 may be a threaded opening and the closing member may be a tab having an opening and a threaded bolt configured to threadedly engage the threaded opening so as to close the hood onto the top cover 20 and enclose the eyelet terminal opening 28.

In operation, the junction box 12 assembly is delivered to the manufacturer for installation into a product. For illustrative purposes, assume the electric junction box assembly 10 is used in an automotive vehicle. The junction box 12 assembly is provided to the automotive manufacturer sealed, wherein the hood 24 and the top cover 18 are mounted to the junction box 12. The manufacturer removes the hood 24 and so as to connect the electric junction box 12 to a power source vis-à-vis the terminal connection. Thus, the electric components underneath the top cover 18 and disposed within the junction box 12 remain enclosed and protected.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter. For instance, the specification and figures show the first cut-out 20 and a hood mounting structure 22 on a side edge of the respective top cover 18 and junction box 12. However, it should be appreciated that the first cut-out 20 may be located elsewhere in the junction box 12. In such an instance, the location of the eyelet terminal 42, eyelet terminal support 40 and eyelet terminal opening 28 would moved with respect to the junction box 12 so as to position the first cut-out in communication with the eyelet terminal 42, and the hood 24 would be used to cover the eyelet terminal opening 28 in the same manner as generally described herein.

The invention claimed is:

1. An electric junction box assembly for housing electric components configured to control an electrically powered device, the electric junction box assembly comprising:
a junction box configured to store the electric components, the junction box including an eyelet terminal support and an eyelet terminal, the eyelet terminal support, the eyelet terminal support is a first wall mounted on a substrate of the junction box, the eyelet terminal support at least partially bounding the eyelet terminal so as to define an eyelet terminal opening being open to a front portion of the junction box so as to make the eyelet terminal accessible through the eyelet terminal opening;
a cover configured to cover the substrate of the junction box, the cover having a first cut-out and a hood mounting structure, wherein the first cut-out is dimensioned to bound the eyelet terminal opening; and
a hood having a closing member, the hood configured to engage the hood mounting structure, wherein the first cut-out is in open communication with the eyelet terminal opening, wherein in one instance the closing member is configured to engage the hood mounting structure so as to cover the eyelet terminal and wherein in another instance the closing member configured to disengage from the hood mounting so as to expose the eyelet terminal without having to remove the cover from the junction box.

2. The electric junction box assembly as set forth in claim 1, wherein the junction box includes a bottom housing and a bottom cover, the substrate mounted on the bottom housing.

3. The electric junction box assembly as set forth in claim 2, further including at least one fastener, the at least one fastener being configured to close the top cover to the bottom housing.

4. The electric junction box assembly as set forth in claim 1, wherein the first cut-out is disposed on a first outer wall of the cover and wherein said eyelet terminal support is disposed on a second outer wall of the junction box.

5. The electric junction box assembly as set forth in claim 1, wherein the closing member is configured to engage the hood mounting structure in a snap-fit engagement.

6. The electric junction box assembly as set forth in claim 5, wherein the hood includes a top portion having a first peripheral wall extending from a top wall so as to define an eyelet terminal housing, a second portion having a second peripheral wall extending from a back wall so as to define a wire housing.

7. The electric junction box assembly as set forth in claim 6, wherein the closing member includes a clip having a cage with an open side and a tang disposed within the cage, the tang configured to engage the hood mounting structure so as to secure the hood to the cover.

8. The electric junction box assembly as set forth in claim 7 wherein the cage includes a first side member spaced apart from a second side member, wherein the tang is disposed between the first side member and the second side member, and wherein the second side member includes an end portion which is generally orthogonal to a body portion.

9. The electric junction box assembly as set forth in claim 8, wherein the hood mounting structure includes a lip defining the first cut-out and an inner wall spaced apart from the outer wall so as to define a recess configured to seat the first peripheral wall of the hood.

10. The electric junction box assembly as set forth in claim 9, wherein the hood mounting structure further includes a flange having a first leg orthogonal to a second leg, and a guide wall spaced apart from the first leg of the flange so as to define a first slot, the second leg spaced apart from an outer surface of the cover so as to define a second slot, wherein the first slot is configured to receive the end portion of the clip and the second slot is configured to receive the first side member of the clip so as to place the second leg between the first side member and the tang.

11. The electric junction box assembly as set forth in claim 10, wherein the second leg of the flange is configured to releasably engage the tang so as to connect and disconnect the hood from the cover.

12. The electric junction box assembly as set forth in claim 11, wherein a first surface of the second leg of the flange includes a first catch and the inner surface of the tang includes a second catch, wherein the first catch and the second are configured to releasably engage each other so as to connect and disconnect the hood from the cover.

* * * * *